United States Patent [19]

Hazelwood

[11] Patent Number: 5,366,097
[45] Date of Patent: Nov. 22, 1994

[54] RECYCLABLE MATERIAL SEPARATING DEVICE

[76] Inventor: Lewis Hazelwood, P.O. Box 1268, Stuart, Va. 24171

[21] Appl. No.: 40,882

[22] Filed: Mar. 31, 1993

[51] Int. Cl.⁵ .............................................. B07C 7/04
[52] U.S. Cl. ................................... 209/704; 209/930; 193/23; 193/29
[58] Field of Search ............... 209/702, 703, 704, 706, 209/930; 193/23, 29; 232/43.1, 43.1, 1 E, 43.5, 44

[56] References Cited

U.S. PATENT DOCUMENTS

| | | |
|---|---|---|
| 282,425 | 7/1883 | Watson . |
| 1,021,404 | 3/1912 | Gardner . |
| 1,580,176 | 4/1926 | Stone . |
| 4,691,837 | 9/1987 | Dillon . |
| 4,867,328 | 9/1989 | McCarthy . |
| 5,031,829 | 7/1991 | Shantzis . |

FOREIGN PATENT DOCUMENTS

| | | |
|---|---|---|
| PCT/DK90/-00027 | 8/1990 | Denmark . |
| 3011527.6 | 10/1981 | Germany . |
| 117879 | 1/1970 | Norway . |
| 7317451-8 | 9/1976 | Sweden . |
| 448898 | 11/1974 | U.S.S.R. . |

*Primary Examiner*—David H. Bollinger
*Attorney, Agent, or Firm*—Rhodes, Coats & Bennett

[57] ABSTRACT

A recyclable material separating device which is placed into a window opening or a cut-out in a wall. When the selection handle is moved to a desired position and the inner access door is opened, recyclable material can be placed into an outside chute which carries material through an elbow chute to a specific collection receptacle below where it is stored for later retrieval.

3 Claims, 2 Drawing Sheets

RECYCLABLE MATERIAL SEPARATING DEVICE

BACKGROUND OF THE INVENTION (1) Field of the Invention

The present invention relates generally to home recycling, and, more particularly, to a device for the separation and storage of recyclable materials.

(2) Description of the Prior Art

Recycling is more in demand today than ever before. Previous recycling devices include U.S. Pat. No. 4,691,837 which is placed in a sink cabinet, and U.S. Pat. No. 4,867,328 which is placed in the kitchen floor, in a closet, or in a garage where there is too little room already. These inconveniences cause the public to be more reluctant to recycle.

Thus, there remains a need for a new and improved recycling device which will make recycling easier, and the storage of recyclable materials more convenient because the material will be separated and stored outside of the house and out of the way.

SUMMARY OF THE INVENTION

The present invention is directed to a recycling device having five material receptacles placed in a half-circle rack which is mounted on an outside wall of the house. The rack is mounted directly underneath an elbow-shaped chute which is attached to the main body of the device on a ball-bearing and race unit so it will move smoothly in a 180-degree arch by a selection handle from inside the home. A selection handle has a indicator arrow mounted on it which points to a line of labels showing which recyclable material is being placed into the outside chute, and also which receptacle the elbow chute is emptying into. The present invention can be easily placed in a raised window opening and it has expandable doors on each side to fill in any air space not covered by the device. It can also be placed in a cut-out opening in a wall.

Accordingly, it is an object of the present invention to provide a quick, inexpensive, and easy means for recycling which, in turn, should encourage more people to recycle.

This and other objects of the present invention will become apparent to those skilled in the art after a reading of the following description of the preferred embodiment when considered with the drawings.

DESCRIPTION OF THE PREFERRED EMBODIMENTS

Figure 1:
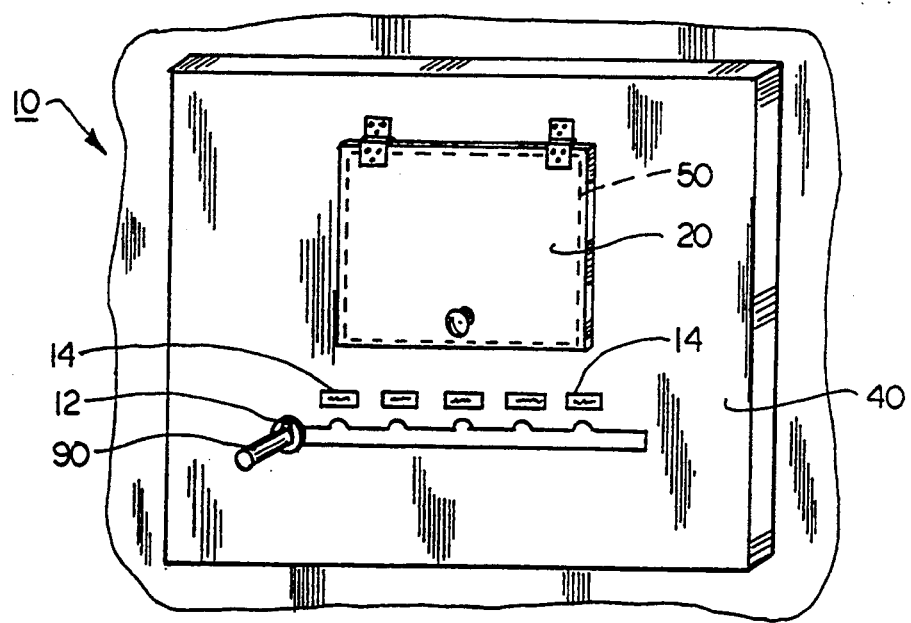
FIG. 1 is a perspective view of a recyclable material separating device, constructed according to the present invention, mounted in a wall.

In the following description, like reference characters designate like or corresponding parts throughout the several views. Also in the following description, it is to be understood that such terms as "forward", "rearward", "left", "right", "upwardly", "downwardly", and the like are words of convenience and are not to be construed as limiting terms.

Referring now to the drawings in general and FIG. 1 in particular, it will be understood that the illustrations are for the purpose of describing a preferred embodiment of the invention and are not intended to limit the invention thereto. As best seen in FIG. 1, there is shown a front view of the main body of the device. The main body of the device 10, consists of two sections of a durable material which make up the front and back panels of the main body of the device. The access door 20 which, when opened, leads to the outside chute 30, shown in FIG. 2 and is made of the same durable material as the front and back panels. The outside chute is made of the same material as the elbow chute and receptacles.

Figure 2:
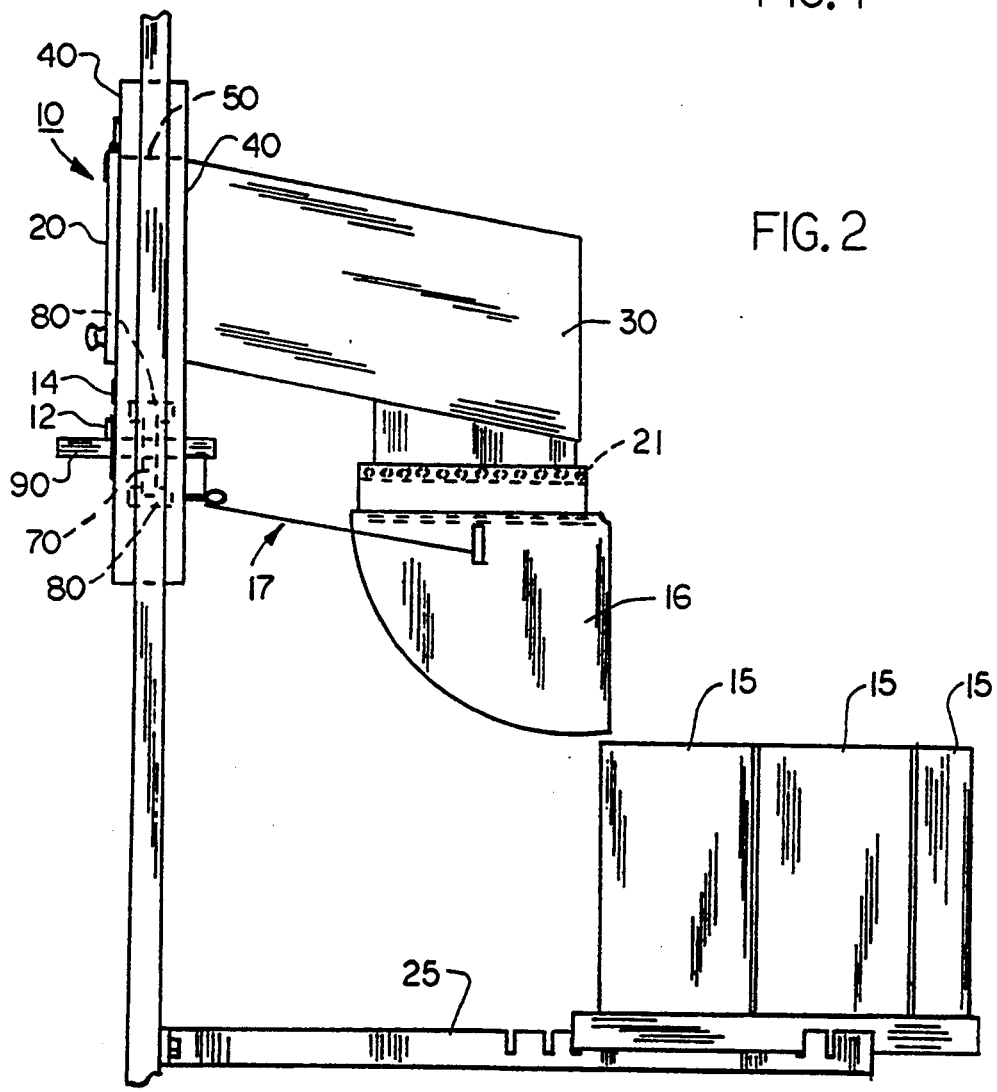
FIG. 2 is a side elevational view of the present invention thereof; the opposite side elevational view being a mirror image.
Figure 4:
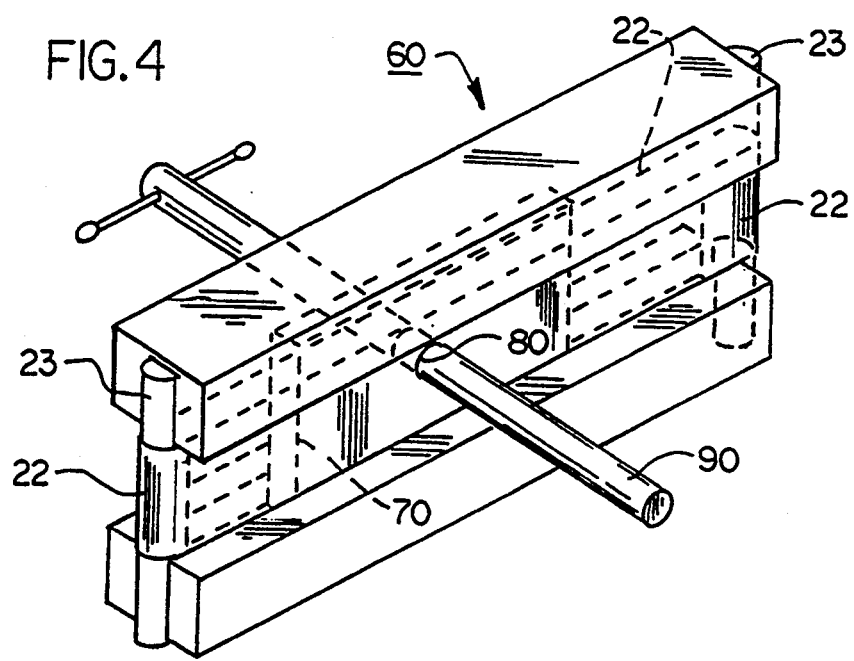
FIG. 4 is an enlarged perspective view showing the selector slide assembly.

The outside perimeter of the front and back panels 40, and the perimeter of the access door opening 50 shown in FIG. 1, are separated with one-and-one-half inch square sections of durable material comparable to the front and back panels. This one-and-one-half inch separation of the front and back panels forms a hollow structure and allows space for the selector slide assembly 60 which is shown in FIG. 2 and FIG. 4. The slide bar 70 allows the selection handle 90 to pass through the slide bar 80 stabilizing the selection handle 90 while moving to different selections.

Figure 3:
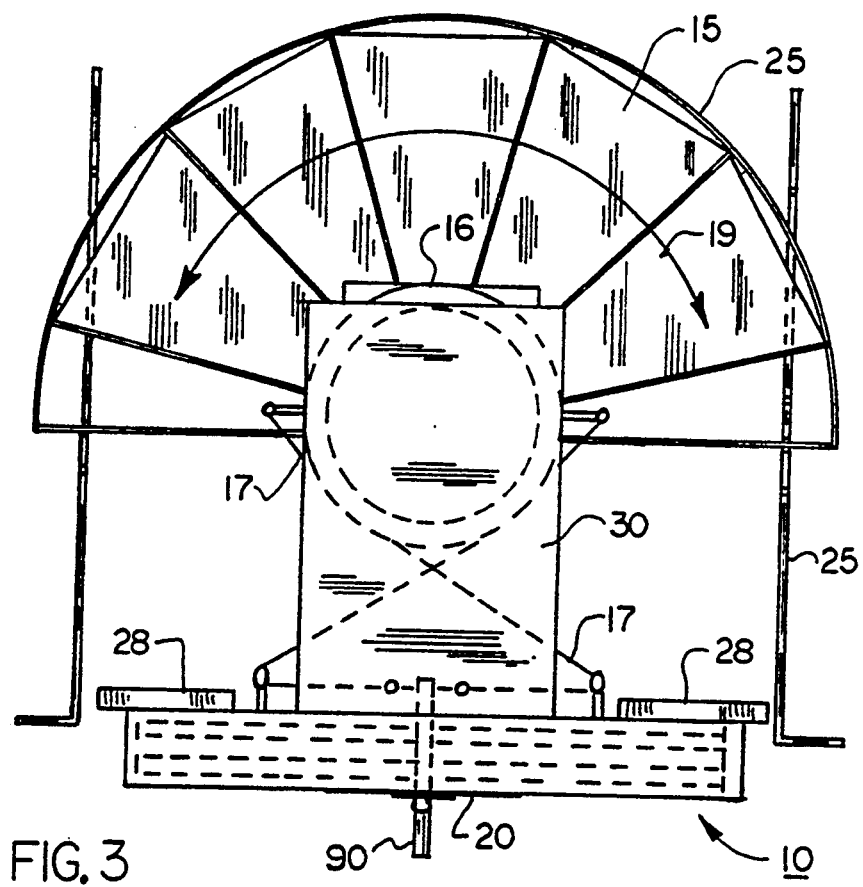
FIG. 3 is a top plan view thereof.

The indicator arrow 12 is mounted on the selection handle 90. When the selection handle is utilized, the indicator arrow moves with it to a line of five printed labels 14, which are located on the face of the main body of the device. With the indicator arrow pointing to a certain label, it shows the user of the device which recyclable material receptacle, shown in FIG. 3, is being used. The labels may read aluminum, tin, glass, plastic or the names of any recyclable material desired to be recycled.

The selection handle 90 is connected to the elbow chute 16 by a network 17 of cables and pulleys. When the selection handle 90 is moved to different positions, the cable 17 network will, in turn, move the elbow chute which is mounted to the outside chute 30 by a ball-bearing and race unit 21. This unit allows for a smooth turn of the elbow chute in a 180-degree arch or half circle designated at 19, to five separate receptacles 15 directly underneath, and in line with the travel of the elbow chute 16.

The receptacles 15 are set underneath the elbow chute 16 in a metal rack that mounts to the outside wall of the housing and is adjustable to the different thicknesses of wall building materials. The receptacles 15 and the receptacle rack are designed to form a half circle so the elbow chute 16 will empty into the selected receptacle.

FIG. 3 shows a set of adjustable doors 28, set in a metal slide, mounted on both sides of the back panel. These doors are to adjust to any size window opening and fill in space left by the device when the window is pulled down.

The slide bar 70 as shown in FIG. 4 has a strip of rubber material 22 fastened to it in a solid belt. This rubber belt moves on a roller 23 at each end of the slide bar track. These two rollers keep the rubber belt in line and straight to prevent outside air from leaking inside.

Certain modifications and improvements will occur to those skilled in the art upon a reading of the foregoing description. It should be understood that all such modifications and improvements have been deleted herein for the sake of conciseness and readability but are properly within the scope of the following claims.

I claim:

1. A recyclable material separating device for segregating various types of refuse operably placed into a window opening or a cut-out of a wall of a building comprising:

a main body including a front and rear panel constructed from a durable material, said front and rear panel being spaced from one another so as to form a hollow structure and having an access door;

a slide bar and slide bar track mounted within the hollow structure, said slide bar carrying a selection handle mounted therethrough; said front panel having an elongated slot through which a first end of the selection handle extends; said slot having a plurality of discrete locations along its length, each location corresponding to one of the various types of refuse; and a moveable elbow chute operatively connected at a first open end to said said hollow structure and having a second open end selectively aligned with one of a plurality of receiving means; actuation means interconnecting said elbow chute and a second end of said selection handle; whereby said selection handle is selectively moved with the slide bar along the slide bar track to one of said discrete locations, said actuation means moves the discharge end of said elbow chute into alignment with a desired receiving means.

2. The recyclable material separating device of claim 1 further comprising an outside chute positioned between said access door and said elbow chute; a ball-bearing and race unit supporting said elbow chute on said outside chute to provide movement of the discharge end of the elbow chute in a 180-degree half circle; and said actuation means includes a cable connected to said selection handle and diametrically opposed sides of the elbow chute through a pair of pulleys located one on each side adjacent to said selection handle.

3. The recyclable material separating device of claim 2 further comprising a receptacle can rack for supporting said plurality of receiving means; said plurality of receiving means comprise a plurality of wedge shaped cans supported on said rack so as to form a half circle when placed side-by-side on said rack; and adjustable bracket means for supporting said rack on a wall of said building beneath the discharge end of said elbow chute.

* * * * *